United States Patent
Abramson et al.

(10) Patent No.: US 7,983,410 B2
(45) Date of Patent: Jul. 19, 2011

(54) CALL HANDLING OF AN INDETERMINATE TERMINATION

(75) Inventors: Sandra R. Abramson, Freehold, NJ (US); Stephen M. Milton, Freehold, NJ (US); C. Joanne McMillen, Northglenn, CO (US); John H. Meiners, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 1171 days.

(21) Appl. No.: 11/169,109

(22) Filed: Jun. 28, 2005

(65) Prior Publication Data

US 2007/0003039 A1    Jan. 4, 2007

(51) Int. Cl.
*H04M 3/00*    (2006.01)
(52) U.S. Cl. .............................. 379/265.01; 379/211.02
(58) Field of Classification Search ............. 379/265.01, 379/211.01, 211.03
See application file for complete search history.

(56) References Cited

U.S. PATENT DOCUMENTS

| | | | | |
|---|---|---|---|---|
| 5,422,936 A | * | 6/1995 | Atwell | 379/88.23 |
| 5,487,111 A | * | 1/1996 | Slusky | 379/211.03 |
| 6,252,945 B1 | * | 6/2001 | Hermann et al. | 379/88.1 |
| 6,252,954 B1 | * | 6/2001 | Malik | 379/221.09 |
| 6,275,577 B1 | | 8/2001 | Jackson | |
| 6,363,142 B1 | * | 3/2002 | Stumer | 379/211.01 |
| 6,718,026 B1 | * | 4/2004 | Pershan et al. | 379/211.01 |
| 6,826,174 B1 | * | 11/2004 | Erekson et al. | 370/352 |
| 2004/0042603 A1 | * | 3/2004 | Edge et al. | 379/211.02 |
| 2004/0174983 A1 | * | 9/2004 | Olschwang et al. | 379/377 |
| 2005/0096006 A1 | | 5/2005 | Chen et al. | |

FOREIGN PATENT DOCUMENTS

| | | |
|---|---|---|
| JP | 2002010312 A | 1/2002 |
| JP | 2003-505937 A | 2/2003 |
| JP | 2003339076 A | 11/2003 |
| WO | 01/06735 A2 | 1/2001 |

OTHER PUBLICATIONS

K. Kobayashi, "Japanese Patent Application No. 2006-178032 Office Action", Oct. 30, 2008, Publisher: JPO, Published in: JP.
Kobayashi, K., "JP Application No. 2006-178032 Office Action Mar. 23, 2010", Publisher: JPO, Published in: JP.
Kobayashi, K., "JP Application No. 2006-178032 Office Action Jan. 5, 2011" Publisher: JPO, Published in: JP.
Xun Liang, "CN Application No. 200610094140.5 Office Action Mar. 6, 2009" Publisher: SIPO, Published in: CN.
Nash, Michael, "EP Application No. 06253377.3-2414 Partial European Search Report Jul. 19, 2007", , Publisher: EPO, Published in: EP.
Nash, Michael, "EP Application No. 06253377.3-2414 / 1739940 European Search Report Oct. 12, 2009", , Publisher: EPO, Published in: EP.

* cited by examiner

*Primary Examiner* — Curtis Kuntz
*Assistant Examiner* — Amal Zenati
(74) *Attorney, Agent, or Firm* — DeMont & Breyer, LLC (57) ABSTRACT

A method and an apparatus are disclosed that improve how an incoming call is handled across multiple data-processing systems, without some of the disadvantages of the prior art. Specifically, in a telecommunications call when a called telephone number is not associated with a particular in-service terminal, an enhanced terminating system of the call refrains from transmitting ringback to the calling terminal until an appropriate event occurs, such as the receiving of an asynchronous response from the auxiliary data-processing system to which the call has been directed. Depending on the response received, the terminating system might refocus the call or provide other treatment to the call. In some embodiments of the present invention, the terminating system also transmits a feedback signal to the calling terminal to provide status to the calling party on the progress of the call attempt, wherein the feedback signal is different than the ringback signal.

12 Claims, 6 Drawing Sheets

CALL HANDLING OF AN INDETERMINATE TERMINATION

FIELD OF THE INVENTION

The present invention relates to telecommunications in general, and, more particularly, to how a call is handled when the telecommunications terminal to which the call is directed is registered with a system that is different than the terminating system of the call.

BACKGROUND OF THE INVENTION

Figure 1:
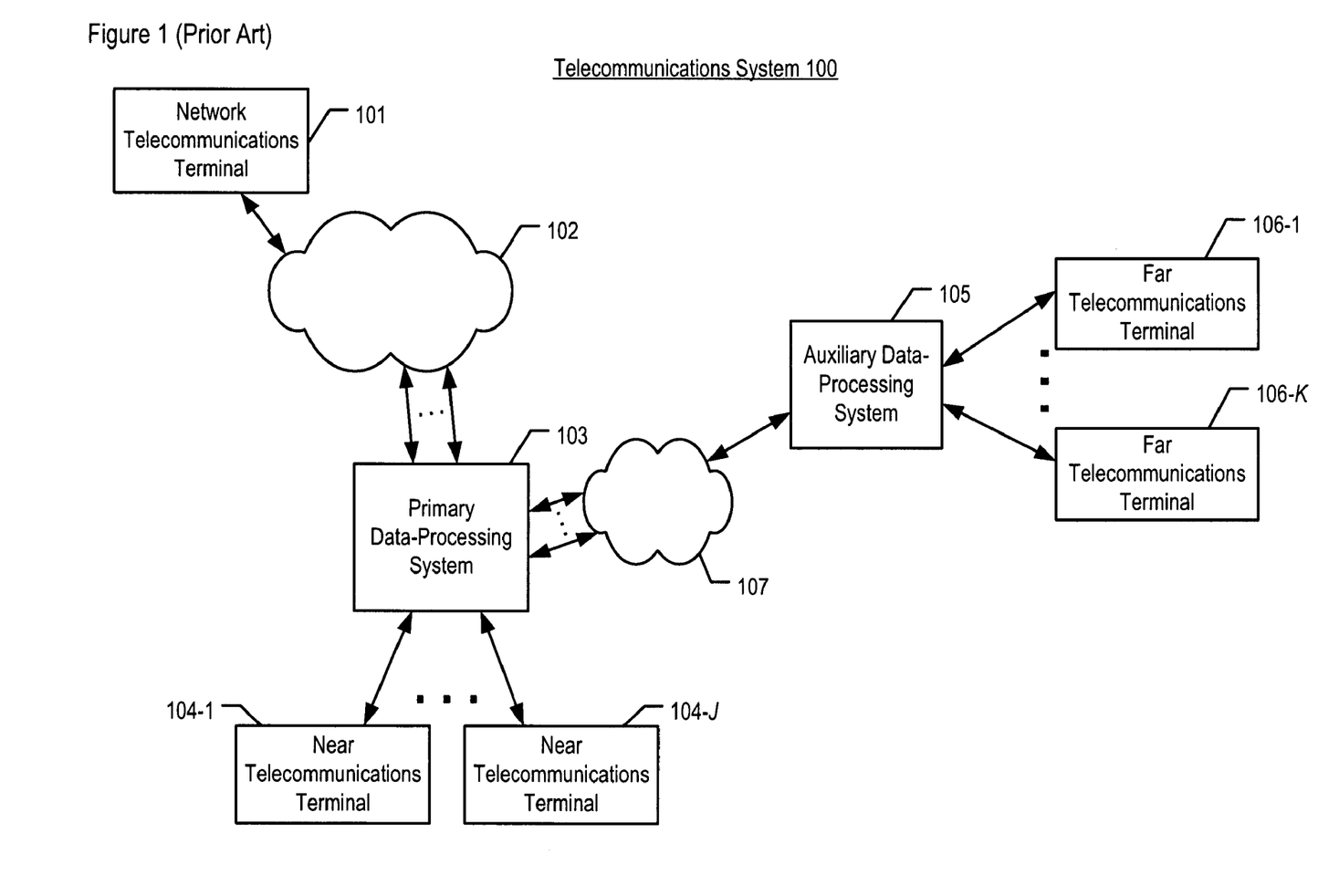
FIG. 1 depicts a schematic diagram of telecommunications system 100 in the prior art.

FIG. 1 depicts a schematic diagram of telecommunications system 100 in the prior art. Telecommunications system 100 comprises:
  i. network telecommunications terminal 101,
  ii. telecommunications networks 102 and 107,
  iii. primary data-processing system 103,
  iv. near telecommunications terminals 104-1 through 104-J,
  v. auxiliary data-processing system 105, and
  vi. far telecommunications terminals 106-1 through 106-K;
all of which are interconnected as shown. The parameters J and K are positive integers.

The telecommunications terminals of system 100 are devices that are capable of originating and receiving calls, as well as exchanging signals (e.g., voice, data, etc.) with other telecommunications terminals. There are three categories of telecommunications terminals in telecommunications system 100: near telecommunications terminals, far telecommunications terminals, and network telecommunications terminals.

Near telecommunications terminal 104-$j$, wherein j is a value between 1 and J, inclusive, is a telecommunications terminal that is associated with primary data-processing system 103. Near terminal 104-$j$ is capable of originating and receiving calls, as well as exchanging signals (e.g., control, voice, data, etc.) with other telecommunications terminals via primary data-processing system 103.

Far telecommunications terminal 106-$k$, wherein k is a value between 1 and K, inclusive, is a telecommunications terminal that is associated with auxiliary data-processing system 105. Far terminal 106-$k$ is capable of originating and receiving calls, as well as exchanging signals (e.g., control, voice, data, etc.) with other telecommunications terminals through auxiliary data-processing system 105.

Network telecommunications terminal 101 is a telecommunications terminal that is associated with telecommunications network 102. Network terminal 101 is capable of originating and receiving calls, as well as exchanging signals (e.g., control, voice, data, etc.) with other telecommunications terminals via network 102.

Telecommunications network 102 provides telecommunications service for one or more network-associated telecommunications terminals, such as network terminal 101, and enables the terminals to communicate with one or more of near terminals 104-1 through 104-J and far terminals 106-1 through 106-K. Network 107 enables telecommunications service between systems 103 and 105 via trunks or other transmission pathways. Telecommunications network 102 or 107 might comprise part or all of the Public Switched Telephone Network (PSTN), part or all of a packet data network, a combination of different types of networks, and so forth. One or more switches, routers, transmission paths, or other telecommunications-enabling devices constitute networks 102 and 107.

Primary data-processing system 103 is a private branch exchange that directly serves and controls near terminals 104-1 through 104-J. Primary system 103 is capable of handling incoming calls (e.g., from terminal 101, etc.) from telecommunications network 102 via one or more transmission lines (e.g., Integrated Services Digital Network trunks, etc.). Primary system 103 forwards each incoming call to a target telecommunications terminal. If the target terminal is associated (e.g., registered, etc.) with primary system 103, then the terminal receiving the call is one of near terminals 104-1 through 104-J. If the target terminal is associated with auxiliary data-processing system 105, then the terminal receiving the call is one of far terminals 106-1 through 106-K. Primary system 103 is also capable of handling calls from near terminals 104-1 through 104-J and far terminals 106-1 through 106-K, and forwarding those calls to one or more other terminals in telecommunications system 100.

Auxiliary data-processing system 105 is a communications server that directly serves and controls far terminals 106-1 through 106-K. Auxiliary system 105 is capable of handling incoming calls (e.g., from network terminal 101, from near terminal 104-$j$, etc.) to far terminals 106-1 through 106-K. Auxiliary system 105 is also capable of handling outgoing calls from far terminals 106-1 through 106-K to other terminals in telecommunications system 100 via primary data-processing system 103.

With respect to the relationship between primary data-processing system 103 and auxiliary data-processing system 105, a call that is placed to a telephone number associated with primary system 103 is routed to primary system 103, but might then be mapped by primary system 103 to: (i) a near terminal 104-$j$, (ii) a far terminal 106-$k$, or (iii) both a near terminal 104-$j$ and a far terminal 106-$k$. For example, primary system 103 might direct an incoming call via a trunk though network 107 and auxiliary system 105 to a far terminal 106-$k$. In the example, the directed-to terminal, far terminal 106-$k$, might be a Session Initiation Protocol-based phone and auxiliary system 105 might be co-located with primary system 103, as part of an enterprise telecommunications system. Alternatively, far terminal 106-$k$ might be a cell phone and auxiliary system 105 might be a distant wireless switching center. Auxiliary system 105 operates asynchronously with respect to primary system 103.

During the setup of a telecommunications call, primary system 103 transmits a ringback signal to the calling terminal (e.g., network terminal 101, etc.), where the calling party hears the signal as a ringback tone. The ringback tone is used to inform the calling party that the called terminal is ringing or otherwise alerting the called party of the call. In North America, for example, the ringback tone is "on" for one second and "off" for three seconds, in repetition. The ringback signal is produced not by the calling party's switch, but by the terminating switch, such as primary system 103.

In a first call-handling scenario, a calling party at network telecommunications terminal 101 calls a telephone number that is associated with primary data-processing system 103. Telecommunications network 102 routes the call to primary system 103, which is the terminating system of the call. If the telephone number is associated with a particular deskset or other type of terminal that is directly served and controlled by primary system 103 (i.e., near telecommunications terminal 104-$j$), the associated terminal is instructed directly by primary system 103 to alert the terminal's user of the call. As the terminating system of the call, primary system 103 also transmits a ringback signal to the calling terminal to inform the calling party that the called terminal is ringing. Because the called terminal is directly served and controlled by primary system 103, system 103 is able to transmit the ringback signal with the certainty that the called terminal has, in fact, received an indication of the call and is alerting its user.

In a second call-handling scenario, the called telephone number, although still associated with primary system 103, is not associated with a terminal that is directly served and controlled by primary system 103. For example, the caller might have called a telephone number does not correspond to a specific, physical terminal associated with primary system 103. Instead, the telephone number might map to a group of terminals (i.e., a subgroup of far telecommunications terminals 106-1 through 106-K) associated with auxiliary data-processing system 105, such as a customer support phone bank. As a result, primary system 103 directs the call over to auxiliary system 105. As the terminating system of the call, primary system 103 transmits a ringback signal to the calling terminal in this second scenario as well. However, because auxiliary data-processing system 105 is a different system than primary data-processing system 103, a response to the directing of the call might not be received by primary system 103 until after ringback is transmitted to the calling terminal. A technique is needed to improve how an incoming call is handled across multiple data-processing systems at the terminating end of the call.

SUMMARY OF THE INVENTION

The present invention provides a technique to improve how an incoming call is handled across multiple data-processing systems, without some of the disadvantages of the prior art. Specifically, in a telecommunications call when a called telephone number is not associated with a particular in-service terminal, an enhanced terminating system of the call refrains from transmitting ringback to the calling terminal until an appropriate event occurs, such as the receiving of an asynchronous response from the auxiliary data-processing system to which the call has been directed. Depending on the response received, the terminating system might refocus the call or provide other treatment to the call.

In accordance with the illustrative embodiment of the present invention, once the terminating system of the call directs the call to a terminal associated with the auxiliary data-processing system, the terminating system monitors for a response back from the auxiliary system. The response can either be: (i) a confirmation that indicates the target terminal (i.e., the "directed-to" terminal) has been notified of the call or is, in fact, alerting its user, or (ii) a failure that indicates the terminal is not able to take the call. If a confirmation is received, the terminating system transmits ringback to the calling terminal. If a failure is received, the terminating system refocuses the call (e.g., to another terminal in a group of terminals, to an alternative telephone number, etc.). The terminating system will also refocus the call if a response is not received within a time interval that is based on a predetermined value. In some embodiments, the value can be set by a technician.

In some embodiments of the present invention, the terminating system transmits a feedback signal to the calling terminal to provide an indication to the calling party that the call setup is (still) proceeding. The transmitted feedback signal is different than the ringback signal to distinguish a "call is being set up" indication from a "phone is ringing" indication. For example, the feedback signal might cause the calling terminal to output clicking sounds, comfort noise, or some other indication to the calling party that the call is still being set up.

The technique of the illustrative embodiment is significant, in that it moves beyond the telecommunications paradigm of assuming that a termination of an incoming call that involves an asynchronous system, such as the auxiliary data-processing system of the illustrative embodiment, has succeeded without confirming that the call termination really did succeed. Previously, the old paradigm of assuming success was usually correct because call-processing failures were typically the result of an under-engineered system. In the current cost-sensitive environment of providing telecommunications service, however, more and more service providers are intentionally under-engineering their systems. The technique disclosed herein can address some of the performance issues that emerge in such an environment.

The illustrative embodiment of the present invention comprises: receiving a call from a calling telecommunications terminal; directing the call to a first telecommunications terminal that is associated with a data-processing system; and refraining from transmitting a ringback signal to the calling telecommunications terminal at least until an indication is received from the data-processing system, wherein the indication indicates that the first telecommunications terminal has been notified of the call.

DETAILED DESCRIPTION

The terms appearing below are given the following definitions for use in this Description and the appended Claims.

For the purposes of the specification and claims, the term "determinate termination" is defined as a station termination to a telecommunications terminal that is registered with the enhanced data-processing system in the illustrative embodiment—that is, the system that executes the tasks described below and with respect to FIGS. 4 through 6. A determinate termination guarantees that a telecommunications terminal is actually alerting as part of the setting up of a call.

For the purposes of the specification and claims, the term "indeterminate termination" is defined as a station termination to telecommunications terminal that is registered with a system other than the enhanced data-processing system, such as with the auxiliary data-processing system in the illustrative embodiment. An asynchronous response from the system where the terminal is registered is required to confirm the call termination of a call that is being set up. Note that a particular, called telephone number might have one or more determinate terminations and might also map to one or more indeterminate terminations.

Figure 2:
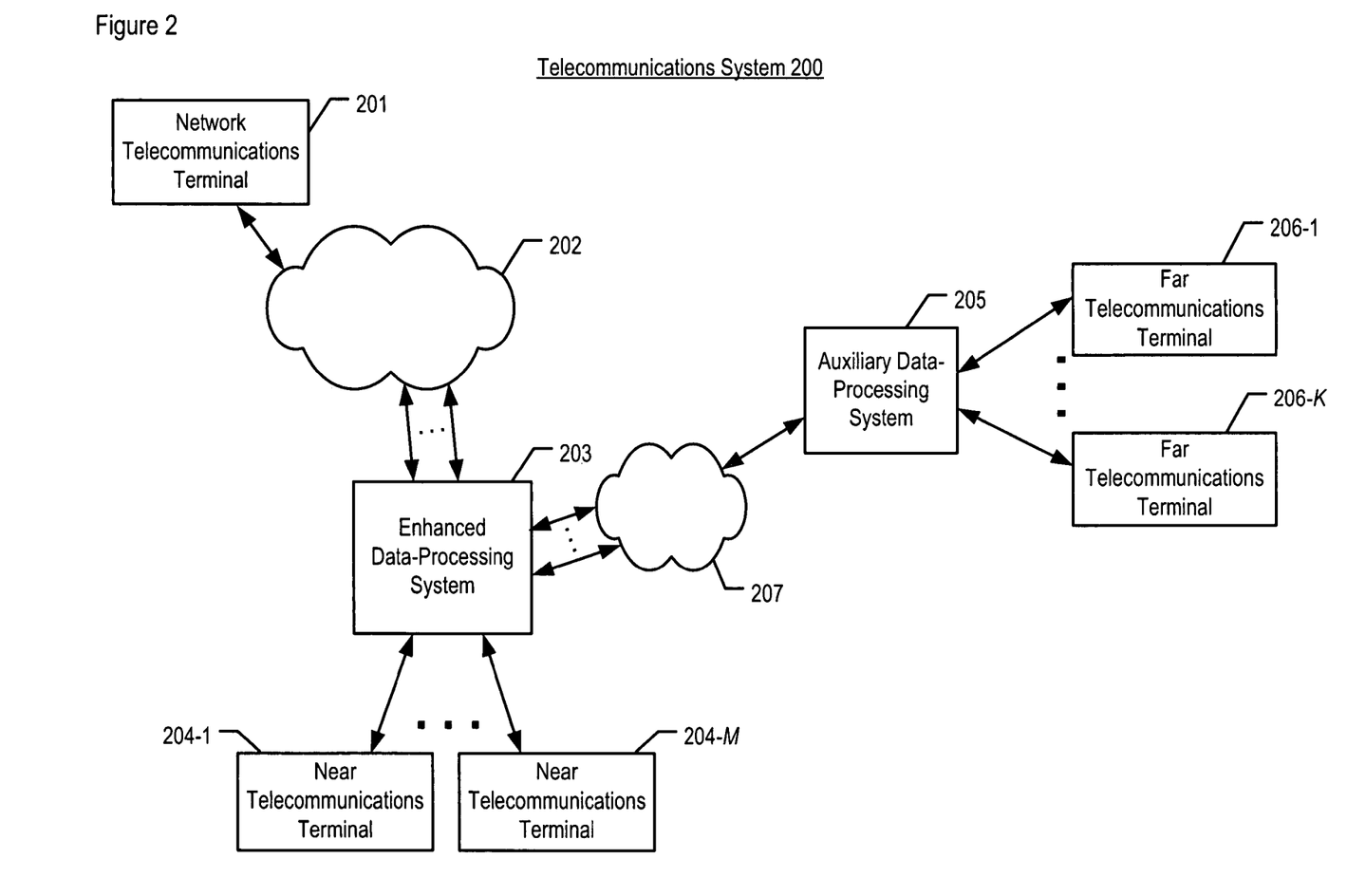
FIG. 2 depicts a schematic diagram of telecommunications system 200, in accordance with the illustrative embodiment of the present invention.

FIG. 2 depicts a schematic diagram of telecommunications system 200, in accordance with the illustrative embodiment of the present invention. Telecommunications system 200 comprises:

i. network telecommunications terminal 201,
    ii. telecommunications networks 202 and 207,
    iii. enhanced data-processing system 203,
    iv. near telecommunications terminals 204-1 through 204-M,
    v. auxiliary data-processing system 205,
    vi. far telecommunications terminals 206-1 through 206-N;

all of which are interconnected as shown. The parameters M and N are positive integers.

The telecommunications terminals of telecommunications system 200 are devices that are capable of originating and receiving calls, as well as exchanging signals (e.g., voice, data, etc.) with other telecommunications terminals. In some embodiments, some of the calls include the initiation of sessions, as is known in the art. There are three categories of telecommunications terminals in telecommunications system 200: near telecommunications terminals, far telecommunications terminals, and network telecommunications terminals. The terms "near" and "far" are used to distinguish between those terminals that are associated with enhanced data-processing system 203 (i.e., the "near" terminals) and those terminals that are associated with auxiliary data-processing system 205 (i.e., the "far" terminals). The adjectives "near" and "far" are not meant to imply any meaning other than that described.

Near telecommunications terminal 204-$m$, wherein m is a value between 1 and M, inclusive, is a telecommunications terminal that is associated with enhanced data-processing system 203. Terminal 204-$m$ is "registered," as is known in the art, with enhanced data-processing system 203 and, as a result, has a determinate termination from the perspective of enhanced data-processing system 203. Terminal 204-$m$ is capable of originating and receiving calls, as well as exchanging signals (e.g., control, voice, data, etc.) with other telecommunications terminals via enhanced data-processing system 203. In accordance with the illustrative embodiment, terminal 204-$m$ is a circuit-based deskset (e.g., a Plain Old Telephone Service wireline telephone, etc.). In some alternative embodiments, terminal 204-$m$ might be another type of terminal, such as an Internet Protocol-capable terminal that transmits and receives packets of information. It will be clear to those skilled in the art how to make and use near telecommunications terminal 204-$m$.

Far telecommunications terminal 206-$n$, wherein n is a value between 1 and N, inclusive, is a telecommunications terminal that is associated with auxiliary data-processing system 205. Terminal 206-$n$ is registered with auxiliary data-processing system 205 and, as a result, has an indeterminate termination from the perspective of enhanced data-processing system 203. Terminal 206-$n$ is capable of originating and receiving calls, as well as exchanging signals (e.g., control, voice, data, etc.) with other telecommunications terminals through auxiliary data-processing system 205. In accordance with the illustrative embodiment, terminal 206-$n$ is an Internet Protocol-capable wireline terminal that transmits and receives packets of information and is a member of a group of phones, such as a customer support phone bank. In some alternative embodiments, terminal 206-$n$ might be another type of terminal, such as a Plain Old Telephone Service wireline telephone, a (wireless) cell phone, and so forth. It will be clear to those skilled in the art how to make and use far telecommunications terminal 206-$n$.

Network telecommunications terminal 201 is a telecommunications terminal that is associated with telecommunications network 202. A terminal that is registered, for example, with a switch, router, or other device in network 202 is associated with telecommunications network 202. Terminal 201 is capable of originating and receiving calls, as well as exchanging signals (e.g., control, voice, data, etc.) with other telecommunications terminals via network 202. In accordance with the illustrative embodiment, terminal 201 is a circuit-based terminal (e.g., a Plain Old Telephone Service wireline telephone, etc.). In some alternative embodiments, terminal 201 might be another type of terminal. It will be clear to those skilled in the art how to make and use network telecommunications terminal 201.

Telecommunications network 202 provides telecommunications service for one or more network-associated telecommunications terminals, such as network terminal 201, and enables the terminals to communicate with one or more of near terminals 204-1 through 204-M and far terminals 206-1 through 206-N. Network 207 enables telecommunications service between systems 203 and 205 via trunks or other transmission pathways. One or more switches, routers, or other telecommunications-enabling devices constitute networks 202 and 207. In some embodiments, telecommunications network 202 or 207 might comprise part of all of the Public Switched Telephone Network (PSTN), part or all of a packet data network, a combination of different types of networks, and so forth.

Enhanced data-processing system 203 is a private branch exchange (PBX) that directly serves and controls near terminals 204-1 through 204-M, in accordance with the illustrative embodiment of the present invention. The salient components of enhanced data-processing system 203 are described below and with respect to FIG. 3. Enhanced system 203 is capable of handling incoming calls (e.g., from network terminal 201, etc.) from telecommunications network 202 via one or more transmission lines (e.g., Integrated Services Digital Network trunks, etc.). Enhanced system 203 forwards each incoming call to a telecommunications terminal. If the target terminal is associated (e.g., registered, etc.) with enhanced system 203, then the terminal receiving the call is one of near terminals 204-1 through 204-M. If the target terminal is associated with auxiliary data-processing system 205, then the terminal receiving the call is one of far terminals 206-1 through 206-N. Enhanced system 203 is also capable of handling calls from near terminals 204-1 through 204-M and far terminals 206-1 through 206-N, and forwarding those calls to one or more other terminals in telecommunications system 200.

In addition, enhanced data-processing system 203 is capable of performing the tasks described below and with respect to FIGS. 4 through 6. Although the illustrative embodiment teaches that a private branch exchange performs the described tasks, it will be clear to those skilled in the art, after reading this disclosure, how to make and use the alternative embodiments of the present invention in which, for example, the tasks are performed by a switch, router, server, or other type of data-processing system within the Public Switched Telephone Network or another type of network. In other words, the present invention is equally well-suited for implementation in public and private telecommunications systems and in wireline and wireless systems as well.

Auxiliary data-processing system 205 is a communications server that directly serves and controls far terminals 206-1 through 206-N, in accordance with the illustrative embodiment of the present invention. In some alternative embodiments, auxiliary system 205 is a switch, router, server, or other type of data-processing system. Data-processing system 205 is capable of handling incoming calls (e.g., from network terminal 201, from near terminal 204-*m*, etc.) to far terminals 206-1 through 206-N. Data-processing system 205 is also capable of handling outgoing calls from far terminals 206-1 through 206-N to other terminals in telecommunications system 200 via enhanced data-processing system 203. It will be clear to those skilled in the art how to make and use auxiliary data-processing system 205.

With respect to the relationship between enhanced data-processing system 203 and auxiliary data-processing system 205, a call that is placed to a telephone number associated with enhanced system 203 is routed to enhanced system 203, but might then be mapped by enhanced system 203 to: (i) a near terminal 204-*m*, (ii) a far terminal 206-*n*, or (iii) both a near terminal 204-*m* and a far terminal 206-*n*. For example, enhanced system 203 might direct an incoming call via a trunk though network 207 and auxiliary system 205 to a far terminal 206-*n*; this might or might not be in addition to directing the incoming call to a near terminal 204-*m*. In the example, the directed-to terminal, far terminal 206-*n*, might be a Session Initiation Protocol-based phone and auxiliary system 205 might be co-located with enhanced system 203, as part of an enterprise telecommunications system. Alternatively, far terminal 206-*k* might be an "off-PBX" cell phone and auxiliary system 205 might be a wireless switching center at a geographically-distant location.

In accordance with the illustrative embodiment, auxiliary system 205 is physically distinct from enhanced system 203 and operates asynchronously with respect to enhanced system 203. Although auxiliary system 205 is physically distinct from enhanced system 203, those who are skilled in the art will appreciate that systems 203 and 205, in some alternative embodiments, might be two software processes executing within the same data-processing system.

Figure 3:
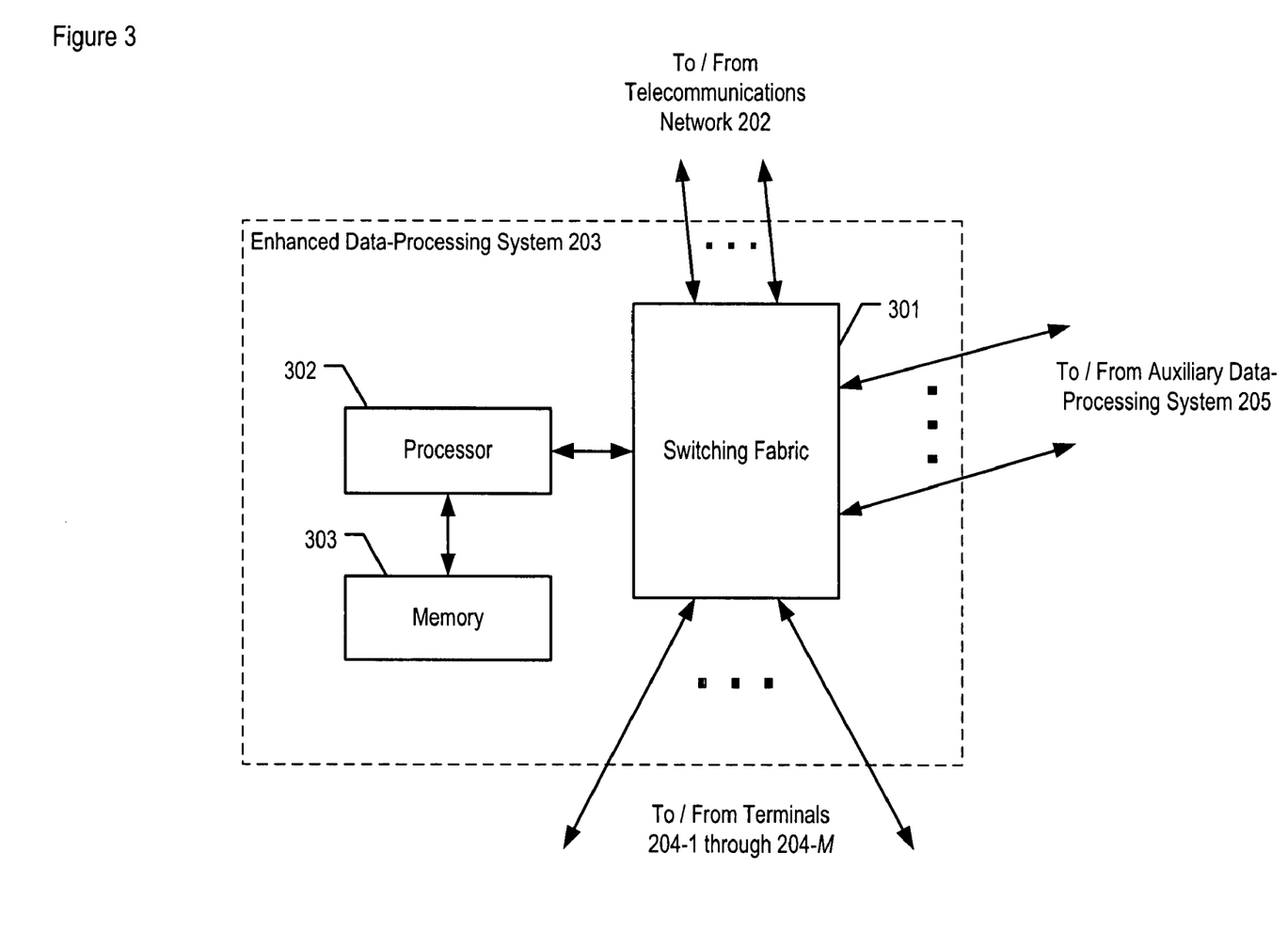
FIG. 3 depicts a block diagram of the salient components of enhanced data-processing system 203, which is part of telecommunications system 200.

FIG. 3 depicts a block diagram of the salient components of enhanced data-processing system 203 in accordance with the illustrative embodiment of the present invention. Enhanced data-processing system 203 comprises: switching fabric 301, processor 302, and memory 303, interconnected as shown.

Switching fabric 301 is capable of performing all of the tasks described below and with respect to FIGS. 4 through 6 under the direction of processor 302. It will be clear to those skilled in the art, after reading this disclosure, how to make and use switching fabric 301.

Processor 302 is a general-purpose processor that is capable of receiving call-related data from switching fabric 301, of reading data from and writing data to memory 303, and of executing the tasks described below and with respect to FIGS. 4 through 6. In some alternative embodiments of the present invention, processor 302 might be a special-purpose processor. In either case, it will be clear to those skilled in the art, after reading this disclosure, how to make and use processor 302.

Memory 303 is a non-volatile random-access memory that stores the instructions and data used by processor 302. It will be clear to those skilled in the art, after reading this disclosure, how to make and use memory 303.

Figure 4:
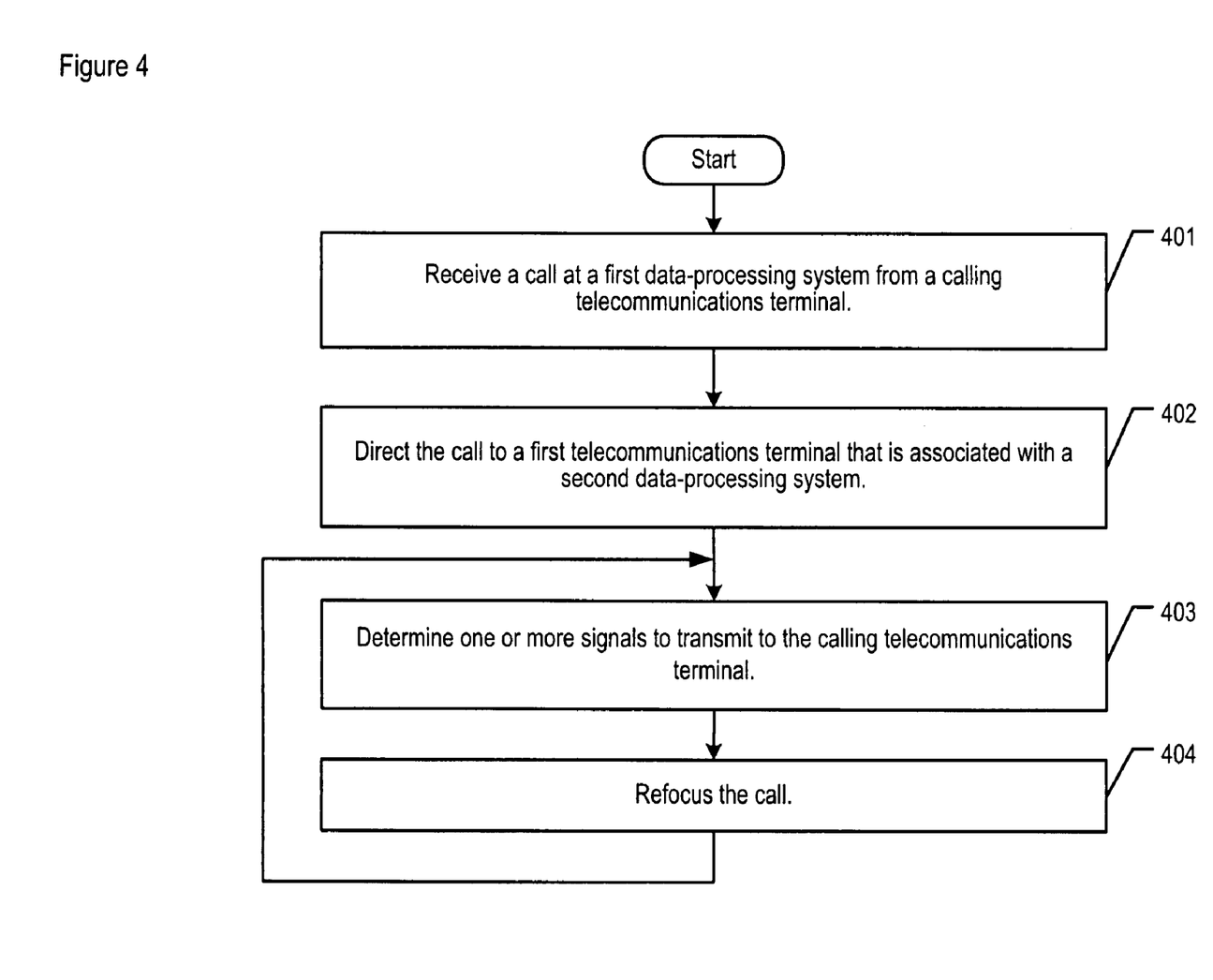
FIG. 4 depicts a flowchart of the salient tasks associated with determining how a call is to be handled, including when the terminal to which the call has been directed is unable to receive the call.

FIG. 4 depicts a flowchart of the salient tasks associated with determining how a call is to be handled, in accordance with the illustrative embodiment of the present invention, including when the terminal to which the call has been directed is unable to receive the call. It will be clear to those skilled in the art which tasks depicted in FIG. 4 can be performed simultaneously or in a different order than that depicted.

At task 401, enhanced data-processing system 203 receives a call from a calling telecommunications terminal, such as network telecommunications terminal 201. A user, for example, placed the call from the calling telecommunications terminal to a telephone number that is associated with enhanced system 203; therefore, the call was routed by network 202 to enhanced system 203. Therefore, enhanced data-processing system 203 is considered to be the terminating system of the call.

At task 402, enhanced system 203 directs the call to a first telecommunications terminal (e.g., terminal 206-1, etc.) that is associated (e.g., registered, etc.) with auxiliary data-processing system 205. In accordance with the illustrative embodiment, the directed-to terminal has a telephone number (or other type of terminal identifier) that is different than the called telephone number to which the call was originally placed. In some alternative embodiments, the first telecommunications terminal is associated with a data-processing system that is physically distinct from enhanced system 203, other than auxiliary system 205.

At task 403, enhanced system 203 determines one or more signals to transmit to the calling telecommunications terminal. For example, enhanced system 203 might determine to transmit a ringback signal, as is known in the art, to the calling terminal to let its user know that the first terminal is alerting its own user of the incoming call. The subtasks that are associated with task 403 are described below and with respect to FIG. 5.

At task 404, enhanced system 203 refocuses the call based on the outcome of the subtasks associated with task 403. The subtasks that are associated with task 404 are described below and with respect to FIG. 6. After task 404, task execution proceeds back to task 403.

Figure 5:
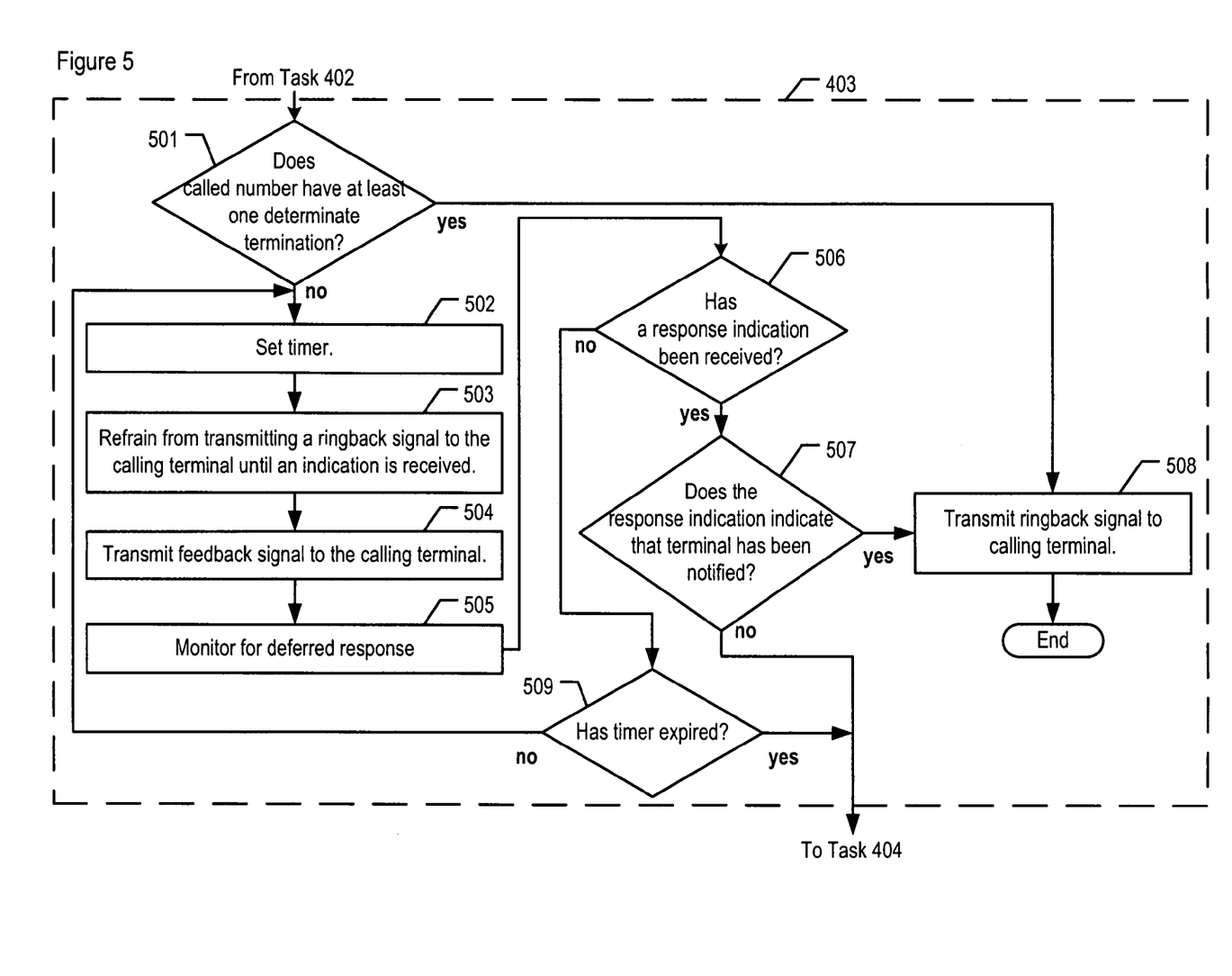
FIG. 5 depicts a flowchart of the salient tasks associated with determining one or more signals to transmit to the calling telecommunications terminal.

FIG. 5 depicts a flowchart of the salient tasks associated with determining one or more signals to transmit to the calling telecommunications terminal (i.e., the subtasks associated with task 403), in accordance with the illustrative embodiment of the present invention. It will be clear to those skilled in the art which tasks depicted in FIG. 5 can be performed simultaneously or in a different order than that depicted.

At task 501, enhanced data-processing system 203 determines if the called telephone number has at least one determinate termination. For example, the called telephone number (or other type of called party identifier) might be associated with a terminal that is registered with enhanced system 203, such as near terminal 204-1. If so, task execution proceeds to task 508. If not, task execution proceeds to task 502.

At task 502, enhanced data-processing system 203 sets and starts a deferred-response timer. Enhanced system 203 uses the timer to establish a maximum length of time that enhanced system 203 will wait for a deferred, asynchronous response (to the currently-directed call) to be received from auxiliary data-processing system 205. The time interval that is tracked by the timer is based on a value that is predetermined, such as by a technician who administers enhanced data-processing system 203. The value is selectable from a range of values, such as from a relatively small value (e.g., 250 milliseconds, etc.) to a relatively large value (e.g., 32 seconds, etc.). In some alternative embodiments, enhanced system 203 maintains multiple deferred-response timers, such as one timer for each trunk group, as is known in the art, that spans from enhanced system 203 towards auxiliary system 205. As those who are skilled in the art will appreciate, there are various ways to administer a timer, as well as other ways than by using a countdown timer to keep track of a time interval.

At task 503, enhanced data-processing system 203 refrains from transmitting a ringback signal to the calling telecommunications terminal at least until an indication is received from auxiliary data-processing system 205, such as an indication that indicates the directed-to terminal has been notified of the call. This is intended to avoid the scenario in which a calling party is provided with ringback, only to be followed by a busy or reorder indication.

At task 504, enhanced data-processing system 203 optionally transmits a feedback signal to the calling terminal to provide feedback on the call setup in progress. It is possible for a calling party to experience a noticeable delay before the call has been directed to a terminal that is able to receive the call, whereupon ringback can be provided to the calling party. Although various types of signals can be used, a suitable feedback signal provides the calling party at least with an indication that the call setup is still proceeding (i.e., has not "gone dead" and is still there). In some embodiments, the feedback signal is intended to cause one or more clicking sounds to be outputted by the calling telecommunications terminal. In some other embodiments, the feedback signal is intended to cause "comfort noise," as is known in the art, to be outputted by the calling telecommunications terminal. In any event, the feedback signal is different than the ringback signal employed by enhanced system 203.

At task 505, enhanced data-processing system 203 continues to monitor for a response from auxiliary data-processing system 205 in well-known fashion.

At task 506, if a response indication has been received, task execution proceeds to task 507. Otherwise, task execution proceeds to task 509. A received response indication indicates the progress of the directing of the call to the directed-to terminal.

At task 507, if the indication indicates that the directed-to terminal has been notified of the incoming call, task execution proceeds to task 508. In some embodiments, the indication of the directed-to terminal having been notified also constitutes a notification that the directed-to terminal is alerting (e.g., ringing, etc.). In some alternative embodiments, responses that constitute a confirmation that would also cause task execution to proceed to task 508 include: (i) a response that indicates the call is alerting or connected on an Integrated Services Digital Network (ISDN) trunk, and (ii) a provisional response other than "100 Trying" or "200 OK" from a Session Initiation Protocol (SIP) trunk.

If, however, the indication indicates that the directed-to terminal has not been notified of the incoming call, task execution proceeds to task 404. In some alternative embodiments, responses that constitute a failure that would also cause task execution to proceed to task 404 include: (i) a response that indicates the call is released from an ISDN trunk, and (ii) any final response from a SIP trunk.

At task 508, enhanced data-processing system 203 transmits a ringback signal to the calling terminal in well-known fashion. Task execution then ends.

At task 509, enhanced data-processing system 203 checks if the timer has expired. If so, task execution proceeds to task 404. If not, task execution proceeds to task 503.

Figure 6:
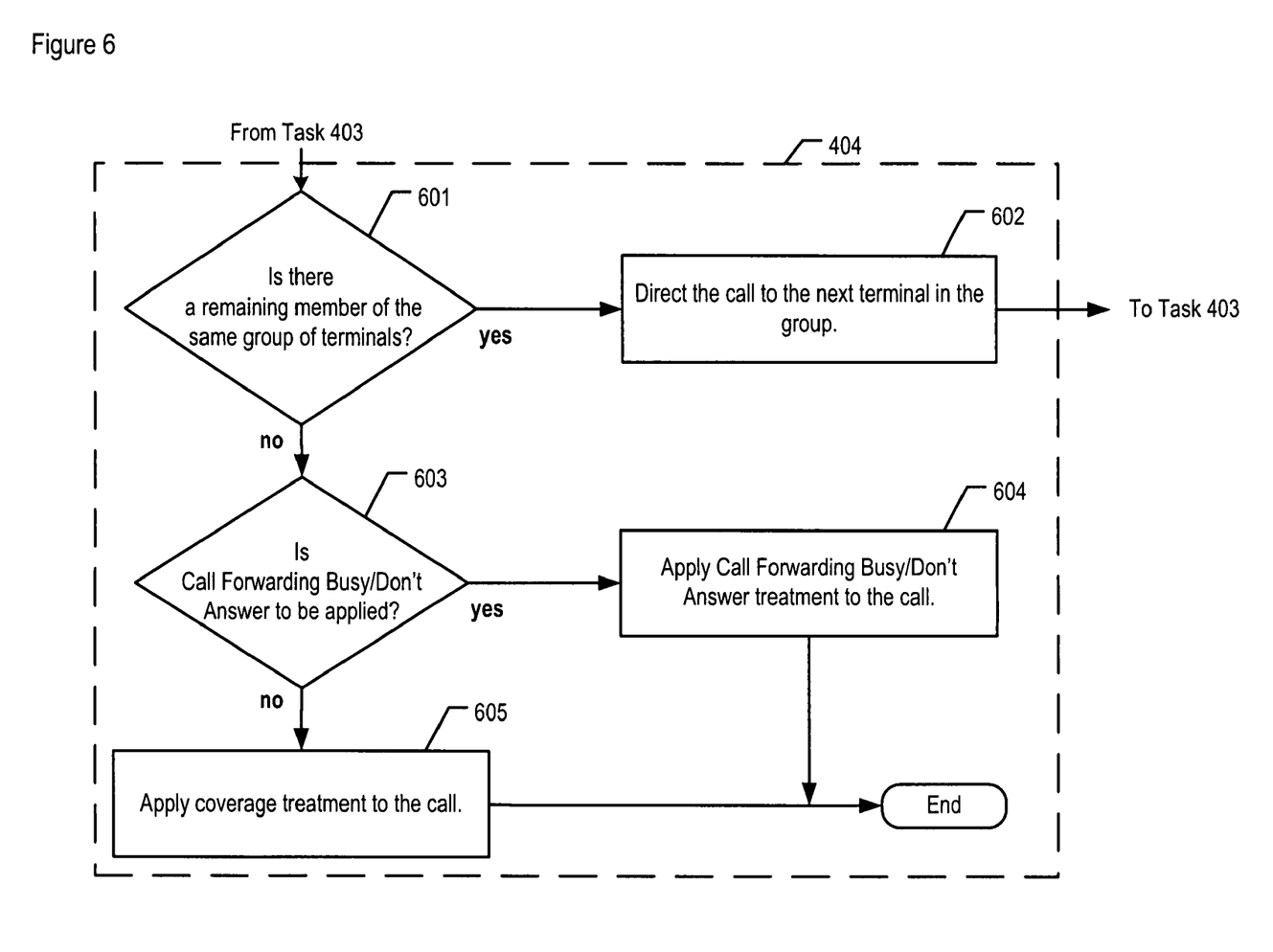
FIG. 6 depicts a flowchart of the salient tasks associated with refocusing the call originated by the calling telecommunications terminal.

FIG. 6 depicts a flowchart of the salient tasks associated with refocusing the call originated by the calling telecommunications terminal (i.e., task 404), in accordance with the illustrative embodiment of the present invention. It will be clear to those skilled in the art which tasks depicted in FIG. 6 can be performed simultaneously or in a different order than that depicted.

At task 601, enhanced data-processing system 203 checks if there is a remaining member (i.e., a member that has not already been tried for the call) from the same group of telecommunications terminals, such as the next station in station-hunting or another member of the hunt group. "Station-hunting" and "hunt groups" are well-known in the art. If there is another member, task execution proceeds to task 602. If there is not another member, task execution proceeds to task 603.

At task 602, enhanced data-processing system 203 directs the call to the next terminal (e.g., terminal 206-2, etc.) in the group. The next terminal might or might not be associated with auxiliary system 205. Task execution then proceeds to task 403.

At task 603, enhanced data-processing system 203 checks if "Call Forwarding Busy/Don't Answer" treatment (or equivalent) is to be applied to the call. "Call Forwarding Busy/Don't Answer" treatment, as is known in the art, forwards the call to a designated terminal if the called party does not answer. If the treatment is to be applied, task execution proceeds to task 604. If the treatment is not to be applied, task execution proceeds to task 605.

At task 604, enhanced data-processing system 203 applies "Call Forwarding Busy/Don't Answer" treatment (or equivalent busy treatment) to the call in well-known fashion. Task execution then ends.

At task 605, enhanced data-processing system 203 applies coverage treatment to the call in well-known fashion. For example, enhanced system 203 directs the call to a default telephone number of a covering party (e.g., an operator, etc.). Task execution then ends.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structures material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method for prolonging feedback to a calling party that call setup is still proceeding, the method comprising: receiving, by a first data-processing system from a calling telecommunications terminal, a call to a first telecommunications terminal that is registered with the first data-processing system; directing, by the first data-processing system, the call to a second telecommunications terminal that is registered with a second data-processing system; refraining, by the first data-processing system, from transmitting a ringback signal to the calling telecommunications terminal, until a response is received by the first data-processing system from the second data-processing system, wherein response indicates that the second telecommunications terminal has been notified of the call; and transmitting, by the first data-processing system to the calling telecommunications terminal, a feedback signal while refraining from transmitting the ringback signal, wherein: i. the feedback signal is different from the ringback signal, and ii. the feedback signal indicates that call setup for the call is still proceeding; and iii. the feedback signal prolongs an indication to the calling party of the calling telecommunications terminal that call setup for the call to the first telecommunications terminal is still proceeding by causing the calling telecommunications terminal to output at least one of a clicking sound and a comfort noise.

2. The method of claim 1 wherein the response indicates that the second telecommunications terminal is alerting.

3. The method of claim 1 further comprising:
transmitting, by the first data-processing system, the ringback signal to the calling telecommunications terminal when the first data-processing system receives the response from the second data-processing system within a time interval;
wherein the time interval is established by the first data-processing system after directing the call to the second telecommunications terminal.

4. The method of claim 1 further comprising:
redirecting, by the first data-processing system, the call to a third telecommunications terminal after directing the call to the second telecommunications terminal;
wherein the call is redirected to the third telecommunications terminal when the first data-processing system fails to receive the response from the second data-processing system within a time interval.

5. The method of claim 4 wherein the third telecommunications terminal is registered with the second data-processing system; and
wherein redirecting the call to the third telecommunications terminal is through the second data-processing system.

6. The method of claim 4 wherein redirecting the call to the third telecommunications terminal is through the first data-processing system.

7. The method of claim 1 further comprising:
transmitting, by the first data-processing system, a busy signal to the calling telecommunications terminal when the first data-processing system fails to receive the response from the second data-processing system.

8. A method comprising: receiving, by a first data-processing system from a calling telecommunications terminal, a call to a first telecommunications terminal that is registered with the first data-processing system; directing, by the first data-processing system, the call to a second telecommunications terminal that is registered with a second data-processing system; refraining, by the first data-processing system, from transmitting a ringback signal to the calling telecommunications terminal, until a response is received from the second data-processing system within a time interval, transmitting, by the first data-processing system, a feedback signal to the calling telecommunications terminal while refraining from transmitting the ringback signal to the calling telecommunications terminal, wherein: i. the feedback signal is different from the ringback signal, and ii. the feedback signal indicates that call setup for the call is still proceeding; and iii. the feedback signal prolongs an indication to the calling party of the calling telecommunications terminal that call setup for the call to the first telecommunications terminal is still proceeding by causing the calling telecommunications terminal to output at least one of a clicking sound and a comfort noise; when the first data-processing system fails to receive the response from the second data-processing system within the time interval, redirecting the call, by redirecting, by the first data-processing system, to a third telecommunications terminal.

9. The method of claim 8 wherein redirecting the call to the third telecommunications terminal is through the second data-processing system.

10. The method of claim 8 wherein redirecting the call to the third telecommunications terminal is through the first data-processing system.

11. The method of claim 8 wherein the time interval is established by the first data-processing system after the call is directed to the second telecommunications terminal.

12. The method of claim 8 wherein the second telecommunications terminal and the third telecommunication terminal are members of a group; and
wherein the first data-processing system redirects the call to the third telecommunications terminal based on the third telecommunications terminal being a member of the group.

* * * * *